CONTROLLING THE FLOW OF IONS AT AN INTERFACE REGION BETWEEN DIFFERENT METALS IN THE PRESENCE OF ELECTRON FLOW SUCH THAT THE RATIO OF RATES AT WHICH IONS ENTER AND LEAVE SAID INTERFACE REGION APPROACHES UNITY TO THEREBY LIMIT FAILURE OF THE METAL WHERE VACANCIES WOULD OTHERWISE APPEAR.

a) ADJUSTING THE GRAIN SIZE OF THE TWO DIFFERENT METALS ON OPPOSITE SIDES OF SAID INTERFACE.

b) FORMING A REGION IN THE INTERFACE REGION OF A SUBSTANCE DIFFERENT FROM SAID DIFFERENT METALS WHICH IS CHARACTERIZED BY THE PRESENCE OF LATTICE DIFFUSION AT A GIVEN TEMPERATURE.

c) INTRODUCING A SOLUTE HAVING A HIGHER DIFFUSIVITY INTO THE METAL HAVING A LOWER DIFFUSIVITY TO COMPENSATE FOR THE LOSS OF IONS OF METAL HAVING THE HIGHER DIFFUSIVITY AT SAID INTERFACE REGION.

d) INCREASING THE THICKNESS OF SAID INTERFACE REGION BY GRADING THE INTERFACE BETWEEN SAID METAL SUCH THAT THE CONCENTRATION OF ONE METAL IN THE OTHER CHANGES GRADUALLY WITH THICKNESS.

e) DIRECTING SAID ELECTRON FLOW IN A DIRECTION OPPOSITE TO THE DIRECTION OF DIFFUSION OF THE METAL HAVING THE HIGHER DIFFUSIVITY WHILE MAINTAINING SAID METAL AT A TEMPERATURE SUFFICIENT TO CAUSE INTERDIFFUSION OF THE METALS.

FIG. 1

United States Patent Office

3,813,263
Patented May 28, 1974

3,813,263
METHOD FOR REDUCING ELECTROMIGRATION DAMAGE AT METAL INTERFACES
Robert Rosenberg, Peekskill, N.Y., assignor to International Business Machines Corporation, Armonk, N.Y.
Continuation of abandoned application Ser. No. 837,778, June 30, 1969. This application Jan. 10, 1972, Ser. No. 216,864
Int. Cl. H01l 7/02
U.S. Cl. 117—201
20 Claims

ABSTRACT OF THE DISCLOSURE

A method for reducing electromigration damage at metal interfaces between interconnection lines and semiconductor contact materials is taught. The accumulation of excess vacancies in an interface region between two different metals is limited by controlling the flow of ions at the interface region in the presence of electron flow such that the ratio of the rates at which ions enter and leave the interface region approaches unity. By eliminating the accumulation of vacancies (which results in void formation) in the interface region, failure of the metal where vacancies would otherwise appear is avoided. The accumulation of excess vacancies is controlled in the operating environment where the two metals must carry current of relatively high density by adjustment of the grain sizes of the different metals; by forming an additional region of another metal in the interface region which is characterized by the presence of lattice diffusion at a desired temperature; by introducing a solute having a higher diffusivity into one of the metals having a lower diffusivity; by increasing the thickness of the interface region by either grading one metal into the other or by introducing another metal which adds to the thickness of the interface region.

Where vacancies occur as a result of interdiffusion at high temperature during bonding of two metals, directing the electron flow in a direction opposite to the direction of diffusion of the metal having the higher diffusivity controls the appearance of vacancies. Controlling the current density also controls the appearance of these vacancies which ultimately lead to catastrophic cracking at either the metal interconnection or at the metal contact material.

---

This is a continuation of application Ser. No. 837,778 filed June 30, 1969, now abandoned.

BACKGROUND OF THE INVENTION

Field of the invention

This invention relates generally to methods for reducing electromigration damage. More specifically, it relates to a method for reducing electromigration damage at metal interfaces which are formed when an interconnection carried on the insulated surface of a semiconductor chip is connected to a contact metal which is an electrode of an active semiconductor device. Using the techniques of the present invention, the appearance of vacancies which lead to catastrophic void formation and/or fracture of either the interconnection metal or the contact metal can be avoided. Since interdiffusion of metal species during bonding and electromigration of metal species in high current density environments can be controlled using the technique of the present application, the teaching of this application is not limited to the semiconductor integrated circuitry art even though its principal application is found in this technology.

Description of the prior art

It is well known that the superposition of an electric field onto random thermal diffusion in a metallic solid causes a net drift of ions in the direction of electron flow. This effect, termed electromigration, is defined by the following equation.

(1)
$$J_i = \frac{N_i D}{kT} \cdot eZ^* E$$

The above equation defines a steady state flux of ions $J_i$ in terms of the drift mobility, $D/kT$, and the driving force, $eZ^*E$ where D is the thermal diffusivity at temperature, T, E is the electric field, $eZ^*$ is the effective charge of the ion with respect to electron scattering, and $N_i$ is the density of the diffusing species. If $J_i$ is constant over the length of a sample, then no change in dimension takes place. If however there are regions within the sample where a discontinuity (or divergence) in $J_i$ occurs, then a change in mass will result and will be given by the following equation.

(2)
$$\frac{dN_V}{dt} = -\nabla J_V + \frac{N_V - N_{0V}}{T_0}$$

Where $dN_V/dt$ is the rate at which vacancies accumulate or are lost at a particular location, $(N_V - N_{0V})$, is the excess number of vacancies at that location above the equilibrium, and $T_0$ is the average time required for a vacancy to reach a sink. Of critical importance is the term $\nabla J_V$, the divergence of the vacancy flux. For a unidirectional flow of atoms and for purposes of the present application, this term can be approximated as $$\frac{\Delta J_V}{\Delta x} \left( = \frac{-\Delta J_i}{\Delta x} \right)$$

It should be appreciated that $\nabla J_i \leq \nabla D$ from equation (1) above and that these terms can be used interchangeably without departing from the spirit of the invention.

In thin film conductor leads or interconnections, the consequence of mass divergence, depletion or build-up is to cause an opening in the circuit resulting from catastrophic void formation and/or fracture or cracking of lead and consequent device failure. This problem has been approached in a number of ways such as by introducing another species into the conductive film which affects diffusivity of the material of the conductive film in itself in such a way that electromigration is substantially slowed down. As a result, vacancy accumulation and the damage resulting therefrom takes a much longer time to appear. Because the major problem, the solution of which is addressed by the present application, is in the semiconductor integrated circuit area where relatively high current densities are required, one solution to the problem of electromigration at the interface between two metals would be to reduce the current density by design changes. This solution, however, is unsatisfactory since future technology will ultimately require higher current carrying capacities than are now called for. Another solution would be to operate the devices at cryogenic temperatures where electromigration is not a problem. This solution is also unsatisfactory since the operation at such low temperatures is prohibitively expensive at this time and raises other problems which are independent of the electromigration problem. The solution to this problem, then, must be one which does not place an undue burden on the circuit designer, must be one which is capable of providing results in higher current density environments, and must be one which does not materially add to the cost of fabrication of integrated circuits and the like. These requirements appear to have the highest possibility of satisfaction at the point of fabrication of the resulting devices. Thus, the major thrust in deterring electromigration damage should be most attractive if it is metallurgical in nature. Such an attack would obviate the necessity for majort efforts in the design area and in the use of other techniques which eliminate the problem at high cost.

SUMMARY OF THE INVENTION

The method of the present invention, in its broadest aspect, comprises the step of controlling the flow of ions at an interface region between two metals in the presence of electron flow such that the ratio of the rates at which ions enter and leave the interface region approaches unity ($\nu J_1 = o$). In this manner, the accumulation of excess vacancies is limited and failure of the metal is avoided.

In accordance with more particular aspects of the invention, the control of the flow of ions at the interface is taught in two environments. In the first environment, a metallic interface, such as the interface between an interconnection and a contact metal of a semiconductor device, is subjected to electron flow. Because of the direction of electron flow, ions of *both metals* migrate in the direction of electron flow and *diffusion across the interface* between the two metals occurs for one of the metals either by lattice or grain boundary diffusion. Grain boundary diffusion is the dominant type of diffusion because in most of the conditions envisioned, utilization of devices is accomplished at temperatures where the grain boundary diffusivity is much larger than the lattice diffusivity.

The second environment where the teaching of the present application can be utilized is at an interface region between two different metals which are being bonded together by thermal action. Under these circumstances, the ions of each metal tend to diffuse across the boundary between the two metals. Because of differences in diffusivity, vacancies tend to be created in the region from which high diffusivity ions have departed and voids are formed. To inhibit the departure of such high diffusivity ions, a current is applied in the direction opposite to the direction of the diffusion of the higher diffusivity ions during fabrication and at the fabrication temperature. In this manner, the diffusion flux of the higher diffusivity ions is inhibited and that of the slower moving ions enhanced, and thus the accumulation of excess vacancies is substantially reduced. It should be clear that by limiting the accumulation of vacancies that the resulting bond will be stronger and the tendency to break or fracture at a region of void formation will be sunbstantially reduced. The current density utilized under such circumstances, is a function of both the temperature and the type of metals being utilized.

In the first environment, where an interface between two dissimilar metals exists in the presence of relatively high density current flow, certain steps for modifications in the structure of the layers are utilized to reduce mass depletion at the junction. These methods include the formation of materials having different grain sizes on either side of the interface, forming a region in the interface region of a metal different from either of the two original metals which is characterized by the presence of lattice diffusion at the temperature of operation; by introducing a solute having a higher diffusivity into the metal layer having the lower diffusivity to compensate for the loss of ions in the metal layer having the higher diffusivity at the interface region, and by increasing the thickness of the interface region by grading the metals into one another or by introducing a separate material to increase the thickness of the interface region. The principles and steps outlined are general in nature and can be used for any arbitrary system of layers where the ionic migration in an electric field are unequal in neighboring layers. In what follows, the specific steps will be defined and an example of each technique with specific materials will be provided.

It is, therefore, an object of this invention to provide a method of limiting the accumulation of excess vacancies in an interface region, the steps of which can be carried out during fabrication of contacts to interconnections and the like.

Another object is to provide a method of limiting the accumulation of excess vacancies which reduces the ratio of rates at which ions enter and leave an interface region to a value approaching unity.

Still another object is to provide a method for limiting the accumulation of excess vacancies to such an extent that failure in the materials involved due to such accumulation of vacancies is almost entirely avoided.

The foregoing and other objects, features and advantages of the invention will be apparent from the following more particular description of a preferred embodiment of the invention as illustrated in the accompanying drawings.

BRIEF DESCRIPTION OF THE DRAWINGS

FIG. 1 is a flow chart diagrammatically outlining the principal method steps for limiting the accumulation of excess vacancies in an interface region between different metals.

FIG. 4 also illustrates the situation where a third metal or compound which is characterized by the presence of a significant amount of lattice or bulk diffusion at the temperature of interest is used.

DESCRIPTION OF A PREFERRED EMBODIMENT

In accordance with the preferred method step as outlined in flow chart form, failure of metal where vacancies would otherwise appear is avoided by:

Step 1.—Controlling the flow of ions at an interface region in the presence of electron flow such that the ratio of the rates at which ions enter and leave the interface region approaches unity.

Figure 2:
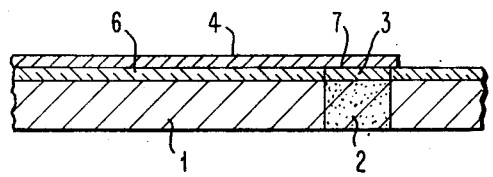
FIG. 2 is a cross-sectional view of a semiconductor wafer having a diffused region which is contacted by a metal contact material. Also shown is an interconnection disposed on an insulated surface of the semiconductor wafer which is bonded to the contact metal at an interface region.

The above recited step encompasses a number of techniques which can be applied to prevent the accumulation of vacancies in metal film structures near their interface. Void formation and mechanical fracture or cracking of interconnections in the high current density environment have been noted as particular problems. FIG. 2 shows a cross-sectional view of a semiconductor chip 1 of silicon or germanium. A diffused region 2 is connected via a contact metallurgy 3 to a metallic interconnecting line 4 which lies atop an insulating layer 6, of silicon dioxide for example, on the surface of chip 1. The region of interest in carrying out the teaching of the present application is the interface 7 between contact metal 3 and interconnection metal 4.

Figure 3:
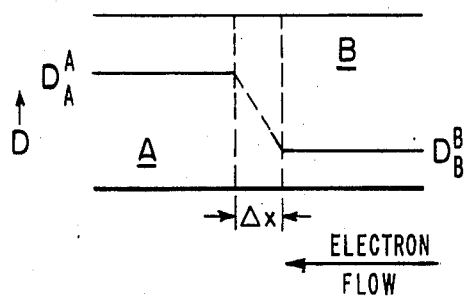
FIG. 3 is a graphical representation of an interface region having a thickness $\Delta x$ between two dissimilar metals A and B. Diffusivity of metal A in itself ($D_A^A$), the diffusivity of metal B in itself ($D_B^B$) and the diffusivity gradient in the interface region in the presence of electron flow are also shown.

Referring now to FIG. 3, an interface region having a thickness $\Delta x$ between two dissimilar metals A and B is shown. The diffusivity of ions A in metal A ($D_A{}^A$), is assumed to be higher than the corresponding diffusivity of ions B in metal B ($D_B{}^B$). The higher diffusivity material has a higher vertical position adjacent the interfacial region in FIG. 3 while the lower diffusivity region has a lower vertical position adjacent the interface region in FIG. 1. The diffusivity gradient is shown by a line joining the diffusivities where they touch the boundaries of the interface region of thickness $\Delta x$. The diffusivities shown are those which would be encountered in two typical metals in the presence of a relatively high current density (e.g. $10^4$–$10^6$ amperes per cm.$^2$). The direction of electron flow in FIG. 3 is indicated by the arrow termed Electron Flow. From equations (1) and (2) hereinabove, the divergence of the flux, or rate of change of mass, can be approximated as (3)
$$\frac{dV_V}{dt} = -\frac{dN_i}{dt} = +\nabla J_i = +\frac{aE}{kT\Delta x}(D_A{}^A N_A{}^A Z_A{}^* - D_B{}^B N_B{}^B Z_B{}^*)$$

where subscripts refer to the diffusing species and superscripts, the media through which ions are diffusing. In equation (3), N is the number of mobile atoms and $Z^*$ is an effective electron scattering parameter. In the particular case represented, a balance of mass at the interface must be maintained by the condition that ions move into the interface region of thickness $\Delta x$ at the same rate as ions are leaving. If this condition is not met, then a net change in ion density occurs, the sign of which depends on the direction of electron flow. In FIG. 3, for example, electrons flow from metal B into metal A. Under such circumstances, ions of metal A will leave the interface at a faster rate than ions of metal B enter the interface. Thus, a depletion or build-up of excess vacancies will take place since, from equation (3), $$\frac{dN_V}{dt} > 0$$

when $\nabla J_i > 0$. Conversely, a build-up of metal A will occur if electrons flow from metal A into metal B. It should be appreciated that although the above representation can be complicated by the added fluxes of thermal diffusion of metal A to metal B and metal B to metal A, at the temperatures concerned, the basic features will not be greatly affected and the requirement of ion supply to the interface remains of primary concern. Also, the expected motion of the interface itself under the circumstance of thermal diffusion, shoud not cause concern since the rate of motion would be far slower than the rate at which depletion would occur if one specie were not diffusing.

From the foregoing, then, it should be clear that the essence of the present method lies in the recognition that the rate at which damage to a metal occurs as a result of the accumulation of vacancies at the interface region under the above conditions must be decreased. The rate at which damage can occur may be controlled by altering the relative diffusivities, the gradient of the diffusivity, $(\Delta D)/(\Delta X)$, and the realtive number of ions that are taking part in the diffusion process in the presence of electron flow. The following are more specific methods by which the rate of accumulation of vacancies may be controlled.

Step a.—Adjusting the grain sizes of two different metals on opposite sides of said interface region.

If electromigration takes place primarily by grain boundary motion rather than by lattice motion in one or more of the layers of the metals involved, then the relative number of ions that are involved in the diffusion process can be controlled by the proper adjustment of grain size of the metals on oppositet sides of the interface. In the situation shown in FIG. 3 where the diffusivity of metal A is higher than the diffusivity of metal B, the divergence of flux, $\nabla J$ can be decreased by making the ratio $N_A{}^A:N_B{}^A$ small by using large grains of metal A and small grain sizes of metal B. As an example, assume activation energies for diffusion, $\Delta H$, to be 0.7 and 1.0 ev. for metal A and metal B, respectively, and further assume $u^*_A = u^*_B$. At 400° K., the divergence is approximately (4) $\quad \nabla Ja = C(N_A 10^{-8} - N_B 10^{-11})$ The reduction in $\nabla Ja$ between $N_A = N_B$ and $N_A$ equal to $10^{-2} N_B$ is, (5) $\quad \dfrac{\nabla Ja(N_A = 10^{-2} N_B)}{\nabla Ja(N_A = N_B)} = \dfrac{CN_B(10^{-10})}{CN_B(10^{-8})} = 10^{-2}$ or a decrease by a factor of 100. Thus, for example, if the grain size of metal A should be greater than 1 micron, then the grain size of metal B should be less than .1 micron, thereby affecting the depletion rate significantly. It should be clear that the limit of zero divergence at the temperature cited results when $N_A:N_B = 10^{-3}$. From the foregoing, it should be clear that metal A of higher diffusivity should be formed of larger grain size material than the metal B of lower diffusivity.

As a practical matter, the metal A is laid down by vacuum deposition or sputtering, for example, at high substrate temperature and metal B is laid down by the same technique at a lower substrate temperature. The high temperature deposition produces large grain sizes while the low temperature produces small grain sizes.

Metal A may be aluminum deposited at 400° C. which provides grain sizes of approximately 5 microns. Metal B which may be of silver, copper, or gold is deposited by evaporation at room temperature and below provides grain sizes of less than .1 micron.

Step b.—Forming a region in the interface region of a different substance from said different metals which is characterized by the presence of lattice diffusion at a given temperature.

Figure 4:
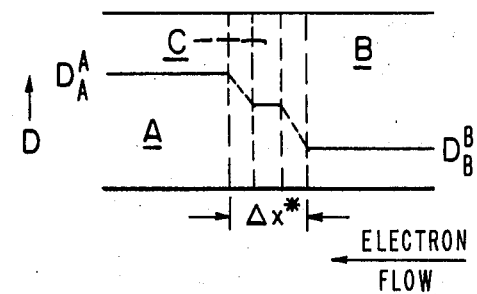
FIG. 4 is a graphical representation of an interface region in which the thickness $\Delta x$ between two dissimilar metals A and B is increased by the addition of another metal or metallic compound C having a diffusivity ($D_C^C$) somewhere in between the diffusivities of metals A and B.

Referring now to FIG. 4, a graphical representation of an interface region having a thickness $\Delta x$ between two metals A and B is shown in which a thin layer of metal of a different specie C is inserted or provided between the metals A and B in the interface region. This drawing illustrates a second method whereby a change in the relative numbers of diffusing ions is changed by inserting a thin layer between metals A and metal B which is characterized by the presence of a significant amount of lattice, or bulk diffusion at the operating temperature. For example, if the activation energy of lattice diffusion in the metal C were equal to one electron volt, and the activation energy for grain boundary diffusion in A is 0.7 electron volts, then the number of ions of C diffusion across the interface would be at least $10^3$ times those of metal A leaving the interface and no divergence would result, even if the grain size of metal C were equal to or larger than that of layer A. This effect produces results similar to those discussed in step a where the ratio $N_A/N_B$ had to be $10^{-3}$ for zero divergence when the diffusivities were described by the same activation energies for the opposite layers and the grain size adjusted. In this case, advantage is taken of the large difference between the density of diffusing species in the lattice as opposed to the density in grain boundaries, expressed as atoms per cubic centimeter of material.

Decreased divergence can be achieved by use of metal C having activation energy values $\Delta H$ for lattice diffusion between those of grain boundary and bulk diffusion for metal A. As a practical matter, for example, where metal A is silver ($\Delta H$ boundary = .86 ev.) and metal B is chromium, ($\Delta H$ boundary = 1.5 ev.), a layer C of silver-cadmium ($\Delta H$ lattice = 1–1.2 ev.) may be introduced to substantially reduce the divergence. It should be appreciated that there are a wide variety of materials both elemental and in compound form which have activation energizes which fall within the criterion specified above. In the present environment, the resulting compounds and elements should be good conductors.

Step c.—Introducing a solute having a higher diffusivity than said metal of lower diffusivity into the metal having the lower diffusivity to compensate for the loss of ions of the metal having the higher diffusivity at said interface region.

Figure 5:
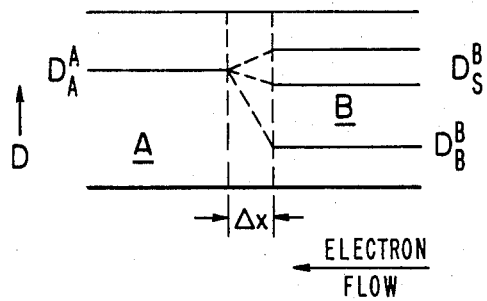
FIG. 5 is a graphical representation of an interface region showing the diffusivities of metals A and B and further indicating the adjustment of the diffusivity of B by the introduction of solute S into the slower diffusing layer B.

Referring now to FIG. 5, there is shown therein a graphical representation of an interface having a thickness $\Delta x$ between two metals A and B. The diffusivity of A is higher than the diffusivity of B. Under such circumstances, one technique for reducing the divergence to a minimum is to add a solute S into the slower diffusing layer such that migration of the solute in the presence of electron flow can compensate for loss or gain of ions of the faster diffusing layer at the interface. The amount of solute S necessary to substantially reduce the total flux divergence is given by, (6) $\quad N_S^B = N_A^A Z_A^* D_A^A : Z_S^* D_S^B$ wherein $D_B^B$ is assumed to be negligibly small. Since $Z_S^*$ is greater than $Z^*_A$ (solute effect on resistivity), concentrations of 1 to 10% should be adequate. It would be most advantageous if $D_A^A$ could be reduced at the interface by incorporation of solute S or B or C. For example, in the case of aluminum as metal A and chromium as metal B, copper would make a good solute S. Where metal A, for example, is silver and metal B is nickel, copper or palladium could be introduced into the nickel.

Step d.—Increasing the thickness of said interface region by grading the interface between said metal such that the concentration of one metal in the other changes gradually with thickness.

Figure 6:
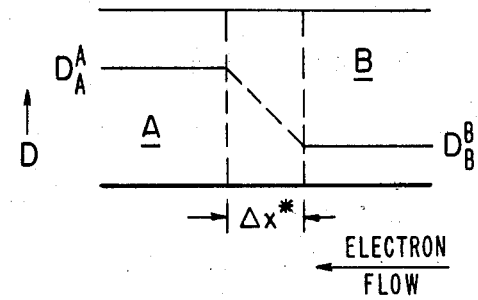
FIG. 6 is a graphical representation of an interface region which illustrates the diffusion gradient change by increasing the thickness of the interface region $\Delta x$ by grading of metal A into metal B.

Referring now to FIG. 6, there is shown a graphical illustration of metal A and metal B having an increased thickness $\Delta x^*$. From equation (3), it should be clear that increasing $\Delta x$ sufficiently will reduce the divergence of flux to a lower value. This can be accomplished by grading the interface; that is, during deposition of metal A and metal B, the material of metal B should be gradually introduced into metal A. The same result of increasing the thickness of the interface region can be accomplished by the use of an intermediate layer C such as shown in FIG. 4. With an ionic flux rate between those of these two extremes, the effective diffusion gradient is decreased.

As a practical matter, the grading of one metal into the other may be accomplished using a two-source evaporation scheme. The metals are then deposited by controlling the evaporation rates of both sources simultaneously such that one is high while the other is low, and vice versa.

An intermediate layer C may be inserted between two metals by any conventional evaporation technique. For example, a layer of antimony ($\Delta H = 1$ ev. for grain boundary diffusion) may be sandwiched between aluminum ($\Delta H$ boundary $= .7$ ev.) and chromium ($\Delta H$ boundary $= 1.5$ ev.). If the insertion of layer C increases $\Delta x$ by a factor of 10 which is nominal, the divergence of flux is decreased by a factor of 10.

Step e.—Directing said electron flow in a direction opposite to the direction of diffusion of the metal having the higher diffusivity while simultaneously maintaining said metals at a temperature to cause interdiffusion of the metals.

Figure 7:
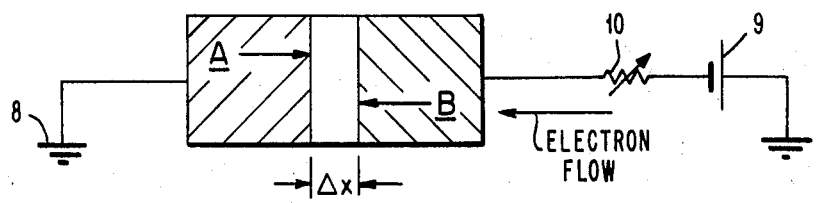
FIG. 7 is a cross-sectional view of two metals A and B being bonded together at temperature in which the directions of diffusion across an interface region of thickness $\Delta x$ are shown. Also shown is an arrangement for applying electron flow in a direction opposite to the direction of diffusion of the higher diffusivity metal.

The above step covers the situation where two metals are being bonded together at some elevated temperature where thermal diffusion is necessary. FIG. 7 shows an interface region $\Delta x$ between metal A and metal B. In the bonding situation at the desired temperature, metal A and metal B tend to diffuse into one another as indicated by the respective arrows labeled A and B in FIG. 7. The vertical displacement of the arrows indicates that metal A has a higher diffusivity than metal B. One side of the piece being bonded is connected to a ground B while the other side is connected to the negative terminal of a battery 9 via a variable resistor 10. When metals A and B are being bonded, the metals tend to interdiffuse. During interdiffusion, it is normal for ions of one species to diffuse across the interface at a higher rate than ions of the species on the opposite side diffuse across the interface. This leads to the development of excess vacancies on the site of the interface containing the faster diffusing species. To prevent this excess of vacancies which would lead to catastrophic void formation and mechanical breakdown near the interface, an electron flow is established in a direction opposite to the direction of diffusion of the higher diffusivity metal. Electron flow is shown by an arrow labeled Electron Flow in FIG. 7. The desired current density is obtained by adjusting variable resistor 10 and the faster diffusing metal A is inhibited in this action by the counterflow of electrons.

The techniques described hereinabove have application in the semiconductor integrated circuit art specifically and to situations where current carrying members have interfaces with different metals. By using the above described techniques, reliability and lifetime of integrated circuits can be substantially enhanced to the point where factors other than failure of interconnections at interfaces with other metals cause breakdown of the circuit.

While the invention has been particularly shown and described with reference to a preferred embodiment thereof, it will be understood by those skilled in the art that the foregoing and other changes in form and details may be made therein without departing from the spirit and scope of the invention.

What is claimed is:

1. A method for limiting the accumulation of excess vacancies in an interface region between different metals to reduce electromigration damage at said interface region, one of said metals having a higher diffusivity than the other, comprising the steps of:
    generating a high density flow of electrons in said metals across said interface which causes a net drift of ions in the direction of electron flow, the rate of electromigration damage at said interface being greater than the rate of electromigration damage in said metals, and
    altering the relative magnitudes of ion flux on both sides of said interface region when flux is associated with grain boundary defects in amounts sufficient to reduce the flux divergence between said metals to substantially zero, the flux being defined as the number of diffusing ions multiplied by their average velocity.

2. A method according to claim 1 wherein the step of altering the relative magnitudes of ion flux on both sides of said interface region includes the step of:
    forming a region in the interface region of a conductive substance different from said different metals.

3. A method according to claim 2 wherein said substance different from said different metals is characterized by grain boundary diffusion.

4. A method according to claim 2 wherein said substance is a metal.

5. A method according to claim 2 wherein said substance is a conducting compound.

6. A method according to claim 1 wherein the step of altering the relative magnitudes of ion flux on both sides of said interface region includes the step of:
    forming a region in the interface region of a conductive substance different from said different metals which is characterized by the presence of lattice diffusion at a given temperature.

7. A method according to claim 6 wherein the activation energy of diffusion values is said substance different from said different metals lies between those values for bulk diffusion and grain boundary diffusion for the higher diffusivity metal.

8. A method according to claim 6 wherein said substance is a metal.

9. A method according to claim 6 wherein said substance is a conducting compound.

10. A method according to claim 9 wherein at least one of the elements of said compound is a metal.

11. A method according to claim 1 wherein the step of altering the relative magnitudes of ion flux on both sides of said interface region includes the step of:
introducing a solute having a higher diffusivity than the diffusivity of said other metal into said other metal to compensate for the loss of ions of the metal having the higher diffusivity at said interface region.

12. A method according to claim 11 wherein the step of introducing a solute includes the step of depositing said metal having the lower diffusivity simultaneously with said solute in concentrations up to 10% by volume.

13. A method according to claim 11 wherein said solute is a metal.

14. A method according to claim 11 wherein said solute is a compound at least one of the constituents of which is a metal.

15. A method according to claim 1 wherein the step of altering the relative magnitudes of ion flux on both sides of said interface region includes the step of:
increasing the thickness of said interface region by grading the interface between said metals such that the concentration of one metal in the other changes gradually with thickness.

16. A method according to claim 15 wherein the step of increasing the thickness of said interface region by grading includes the steps of simultaneously depositing said metals from controlled sources and adjusting said sources to increase the deposition rate from one source while decreasing the deposition rate from the other source.

17. A method according to claim 1 wherein the step of generating a flow of electrons includes the steps of directing said electron flow in a direction opposite to the direction of diffusion of the metal having the higher diffusivity while simultaneously maintaining said metals at a temperautre sufficient to cause interdiffusion of the metals.

18. A method according to claim 17 further including the step of adjusting the density of said electron flow by adjusting the value of current through said metals.

19. A method for limiting the accumulation of excess vacancies in an interface region between different metals to reduce electromigration damage at said interface region, one of said metals having a higher diffusivity than the other, comprising the steps of:
generating a given high density flow of electrons in said metals across and interface, the rate of electromigration damage at said interface being greater than the rate of electromigration damage in said metals, and
simultaneously inhibiting an ion flux in said higher diffusivity metal and enhancing ion flux in said other metal to reduce the flux divergence between said metals to a value approaching zero, said flux being defined as the number of diffusing ions multiplied by their average velocity.

20. A method for limiting the accumulation of excess vacancies in an interface region between different metals, one of said metals having a higher diffusivity than the other, comprising the steps of:
generating a given high density flow of electrons in said metals across said interface, and
simultaneously inhibiting ion flux in said higher diffusively metal and enhancing ion flux in said other metal to reduce the flux divergence between said metals to a value approaching zero wherein said latter step includes the step of adjusting the grain size of the different metals on opposite sides of said interface region, the grain size of said higher diffusivity metal being larger than the grain size of said other metal, said flux being defined as the number of diffusing ions multiplied by their average velocity.

References Cited

Ghate:, Applied Physics Letters, vol. 11, No. 1, pp. 14–16 (July 1967).

RALPH KENDALL, Primary Examiner

U.S. Cl. X.R.

117—227, 107; 29—630, 585, 589